United States Patent [19]

Szekely et al.

[11] 4,226,259
[45] Oct. 7, 1980

[54] REGULATOR MODULE

[75] Inventors: Fred J. Szekely, Tujunga; Charles A. Ray, Arcadia, both of Calif.

[73] Assignee: Clemar Manufacturing Corp., Azusa, Calif.

[21] Appl. No.: 959,515

[22] Filed: Nov. 13, 1978

[51] Int. Cl.³ .................... G05D 16/16; F16K 31/365
[52] U.S. Cl. .................................. 137/269; 137/489; 137/492.5; 251/30
[58] Field of Search ............ 137/488, 489, 492, 492.5, 137/505.18, 269, 270, 271; 251/30

[56] References Cited

U.S. PATENT DOCUMENTS

| | | | |
|---|---|---|---|
| 2,877,978 | 3/1959 | Rider | 137/489 X |
| 2,919,714 | 1/1960 | Mrazek | 251/30 X |
| 2,938,537 | 5/1960 | Silver | 251/30 X |
| 3,358,964 | 12/1967 | Cohen | 137/505.18 X |
| 3,439,895 | 4/1969 | Marandi | 251/30 |
| 4,138,087 | 2/1979 | Kruse | 137/489 X |

Primary Examiner—Alan Cohan
Attorney, Agent, or Firm—Fulwider, Patton, Rieber, Lee & Utecht

[57] ABSTRACT

For use with a remotely actuated fluid supply valve, an internally balanced pressure regulating module is provided for regulating the pressure downstream of the valve by modulating the rate at which fluid is bled from a closure chamber of the valve in response to downstream pressure. The module includes a flow restricting member arranged at the open end of a cylinder and having a first surface facing the open end of the cylinder and a second surface facing outwardly of the cylinder and exposed to downstream pressure. The flow restricting member is secured to a piston in the cylinder which is resiliently biased toward the open end of the cylinder, and the downstream pressure acting on the second surface urges the first surface against the force of the biasing means, into a flow restricting relationship with the open end of the cylinder.

17 Claims, 3 Drawing Figures

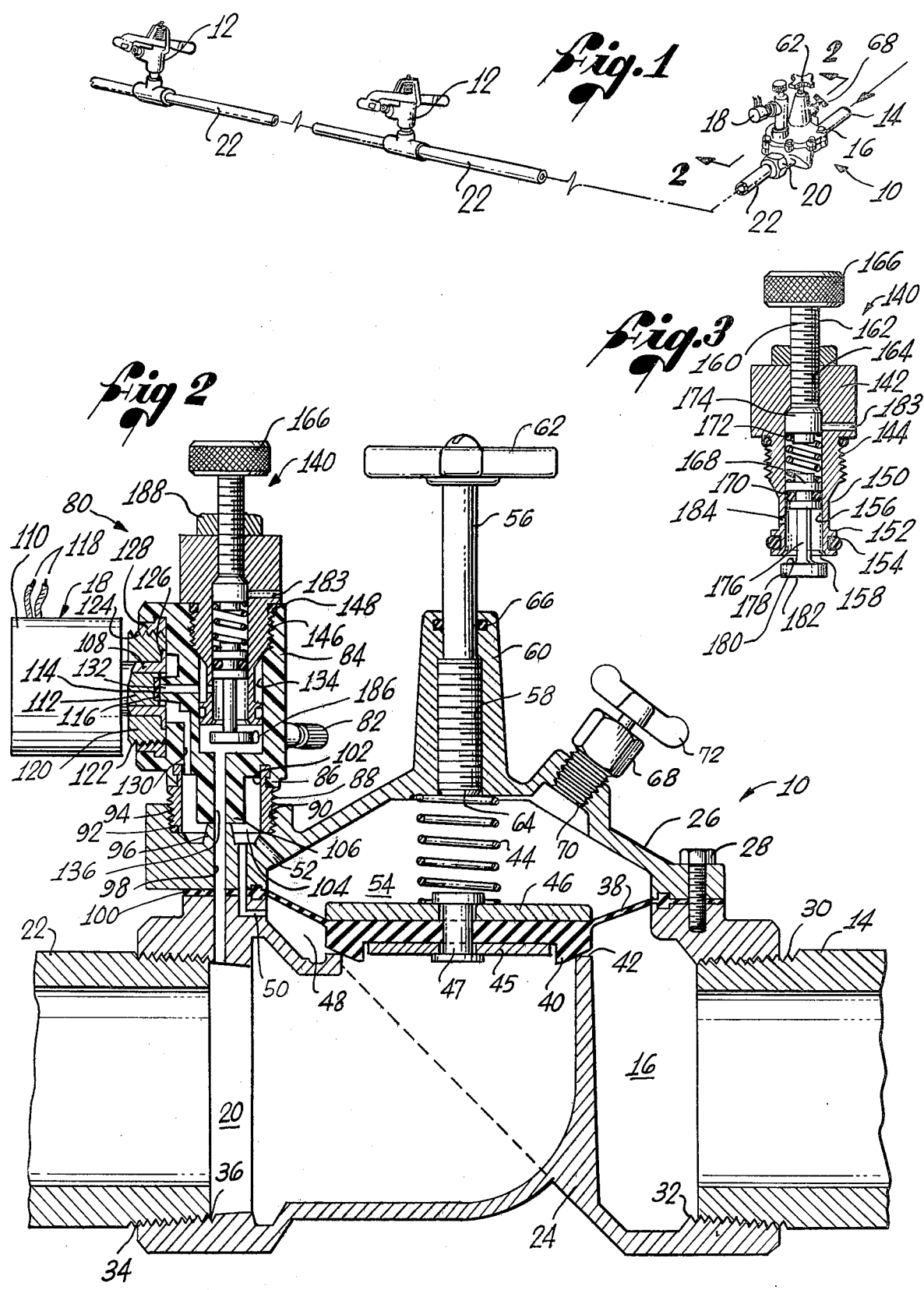

REGULATOR MODULE

BACKGROUND OF THE INVENTION

This invention relates generally to pressure regulating devices for use with irrigation equipment and, more particularly, to a device for regulating the downstream pressure of a remotely controlled water supply valve.

As is well known in the art, it is highly desirable for an irrigation sprinkler, or other irrigation equipment such as a trickle irrigation emitter, to be supplied with water at a constant predetermined pressure. In this way, the irrigation device can be operated at a pressure which provides optimum performance and efficiency and the user of the device can accurately plan and control the amount of irrigation water applied.

One way in which this has been accomplished is by providing a pressure regulator adjacent the inlet of each sprinkler. Naturally, this arrangement accomplishes the desired result, but the expense of providing and maintaining a separate pressure regulator for each sprinkler may not be justified by the advantages gained.

Another method for regulating the pressure supplied to irrigation devices is to interpose a pressure regulator in the supply line to the devices immediately downstream of the remotely controlled valve. Although this method also functions satisfactorily, the pressure regulator must be relatively large in order to conduct the large volume of water supplied to several irrigation devices, and again, the expense of providing and maintaining a larger number of such pressure regulators can be prohibitive.

Accordingly, there has existed a need for a convenient and effective device for regulating the pressure supplied to an irrigation device, such as a conventional sprinkler or a trickle irrigation emitter, which is relatively inexpensive to manufacture and can be adapted for use with conventional remotely controlled supply valves. As will become apparent from the following, the present invention satisfies that need.

SUMMARY OF THE INVENTION

The present invention resides in a new and improved device for use in connection with a remotely actuated fluid supply valve and by which the pressure downstream of the valve is regulated by providing a regulator module on the valve for modulating the rate at which fluid is bled from the closure chamber of the valve in response to downstream pressure. Moreover, the regulator module of the present invention is adapted either for use with new valves of the type described or for converting existing remotely actuated valves to add the pressure regulating capability. In this way, a relatively small, inexpensive regulator can be used to control the pressure of a relatively large quantity of fluid, thereby substantially reducing the cost of regulating the pressure in an irrigation system.

The regulator module of the present invention is intended for use with a valve which is held in a closed position by fluid under pressure supplied to a closure chamber in the valve and bearing against a pressure responsive means, such as a diaphragm, which moves a seal carried by the diaphragm into sealing relation with a seat in the valve. When fluid is bled from the closure chamber, the diaphragm lifts off of the seat, opening the valve.

While the valve is open, fluid under pressure is supplied to the closure chamber at a substantially constant rate, and by closing the passage through which fluid is bled from the chamber, the chamber slowly refills and urges the diaphragm back into sealing relation with the seat. Therefore, by controlling the rate at which fluid is bled from the closure chamber, the distance that the seal is lifted from the seat is controlled, thereby effecting regulation of the pressure downstream of the valve.

Toward this end, the regulator module of the present invention is interposed in the passage through which fluid is bled from the closure chamber and is in pressure sensing communication with the outlet of the valve so that the rate of flow through the module can be regulated in response to the downstream fluid pressure at the valve outlet. More specifically, the module receives fluid under pressure from the closure chamber and includes a remotely actuated valve, such as a solenoid valve, for releasing the fluid to flow first through a flow regulator, and then through a passage communicating with the outlet of the valve. Since the solenoid valve is merely arranged either to permit or prevent flow through the module, the solenoid valve can be placed either upstream or downstream of the flow regulator.

The flow regulator includes a cylinder having an open end and a closed end, and the cylinder is arranged in the module with the open end disposed toward the passage to the valve outlet. A flow restricting member is arranged adjacent the open end of the cylinder and includes a first surface facing inwardly toward the open end of the cylinder and a second surface facing outwardly of the cylinder and exposed to downstream pressure through the passage to the valve outlet. The flow restricting member is secured to a piston in the cylinder which is resiliently biased toward the open end of the cylinder by a helical spring disposed between the piston and the closed end of the cylinder.

The solenoid valve is normally closed for preventing flow out of the closure chamber thereby retaining the valve in a closed position, but when the solenoid valve is opened, it permits fluid from the closure chamber to flow into the cylinder through the side wall thereof, between the piston and the first surface, and out of the open end, around the flow restricting member, and through the passage to the valve outlet. This flow out of the closure chamber allows the valve to open and causes the pressure at the outlet of the valve to increase, which pressure acts on the second outwardly facing surface of the flow restricting member urging it, against the force of the spring, into a flow restricting relationship with the open end of the cylinder. When the outlet pressure is higher than desired, the flow restricting member restricts the flow from the closure chamber, which causes the closure chamber to fill slightly and move the seal on the diaphragm toward the seat, thereby restricting flow through the valve and decreasing the pressure at the outlet of the valve.

The closed end of the cylinder is provided with a means for axially adjusting the initial position of the spring, thereby changing the amount of force required on the second surface of the flow restricting member to move the first surface into a flow restricting relationship with the open end of the cylinder. In this way, the module can be manually adjusted to restrict the flow of fluid from the closure chamber in response to any desired outlet pressure of the valve, thereby maintaining that desired pressure at the outlet of the valve while the valve is open. In order to facilitate the manual adjustment of the valve to the desired pressure, a conventional external fitting can be provided on the module which communicates with the passage to the valve outlet, and a workman can simply attach a pressure gauge to the fitting while the valve is open, and adjust the module to the desired pressure reading on the gauge.

A further advantage of the present invention is that the flow regulator in the module is internally balanced by causing the fluid from the closure chamber to enter the cylinder between the piston and the flow restricting member and exert substantially equal and opposite forces on each. By this arrangement, the regulation of pressure downstream of the valve is independent of the inlet pressure supplied to the valve.

Other features and advantages of the present invention will become apparent from the following detailed description, taken in conjunction with the accompanying drawings, which illustrate, by way of example, the principles of the invention.

BRIEF DESCRIPTION OF THE DRAWINGS

FIG. 1 is a perspective view of a regulator module embodying the present invention, and illustrated assembled on a conventional remotely controlled diaphragm valve arranged for use in connection with a series of irrigation sprinklers;

FIG. 2 is an enlarged, fragmentary, partly sectional view of the regulator module and valve of FIG. 1 taken substantially along line 2—2 of FIG. 1; and FIG. 3 is an enlarged, partly sectional view of the flow regulator of FIG. 2 and illustrated as though removed from the regulator module of the present invention.

DETAILED DESCRIPTION

As shown in the exemplary drawings, the present invention is embodied in a regulator module for use with a remotely controlled, normally closed fluid supply valve, indicated generally by reference numeral 10 in FIG. 1. The valve 10 herein is shown in the drawings as a conventional diaphragm type valve, and is illustrated mounted for use in connection with a series of irrigation sprinklers 12.

When in use, water under pressure is constantly admitted through a supply line 14 to an inlet 16 of the valve 10. By energizing a solenoid valve 18, the supply valve 10 can be opened in a manner which will be described in greater detail later, thereby permitting water from the supply line 14 to flow through the valve and out of an outlet 20 on the valve. A pipe line 22 is connected to the outlet 20 for conducting water from the valve 10 to the sprinklers 12 in order to effect the desired irrigation in a manner well known in the art.

It will be appreciated that, although the present invention is illustrated for use in connection with conventional irrigation sprinklers, it has equal application for use in connection with other types of irrigation equipment, such as trickle irrigation emitters, or any other application where it is desirable to regulate the pressure downstream of a supply valve. Further, the present invention is herein illustrated as mounted for use in connection with a diaphragm type valve, but it will be appreciated that the module could be adapted for use with any other type of valve which is opened or closed by venting or filling a closure chamber, such as a piston valve, or the like.

As can best be seen in exemplary FIG. 2, the valve 10 includes a body 24 to which a bonnet 26 is secured by any suitable means such as by bolts 28. The supply line 14 is provided with external threads 30 which cooperate with the internal threads 32 formed on the body 24 for securing the supply line 14 to the inlet 16 of the valve 10. Similarly, the pipe line 22 is provided with external threads 34 which cooperate with internal threads 36 formed on the body 24 for securing the pipe line 22 to the outlet 20 of the valve 10. The periphery of a diaphragm 38 is clamped between the body 24 and bonnet 26, and a seal 40 integrally formed on the diaphragm 38 is arranged to cooperate with a valve seat 42 formed in the body 24 between the inlet 16 and outlet 20. The seal 40 is urged into contact with the valve seat 42 by a diaphragm spring 44 which engages the inside of the bonnet 26 at one end and the upper surface of a backing plate 46 at its other end. The backing plate 46 is secured to a retaining plate 45 on the opposite side of the diaphragm 38 by any suitable fastener such as a rivet 47.

When water under pressure is supplied to the inlet 16, the water surrounds the valve seat 42 filling both the inlet 16 and a gallery 48 opposite the inlet 16. A passage 50 through both the body 24 and bonnet 26 places the gallery 48 in communication with another passage 52 in the bonnet 26 which opens into a closure chamber 54 formed by the bonnet 26 and the diaphragm 38. Water under pressure in the gallery 48 flows through the passages 50 and 52 thereby filling the closure chamber 54 with water under pressure from the supply line 14. The water under pressure in the closure chamber 54 acts over the entire area of the diaphragm 38 and holds the seal 40 in tight sealing contact with the valve seat 42 against the force of the water pressure on the bottom of the diaphragm 38 acting only over the area between ythe valve seat 42 and the periphery of the diaphragm.

In order to open the valve 10, the fluid under pressure in the closure chamber 54 is vented to atmospheric pressure, or to the pressure at the outlet 20 of the valve, in a manner which will be described in greater detail hereinafter. The decrease in pressure above the diaphragm 38 allows the line pressure below the diaphragm to lift the diaphragm and seal 40 off of the valve seat 42, and water from the supply line 14 is permitted to flow over the seat 42 to the outlet 20 and pipe line 22. When the opening between the closure chamber 54 and downstream or atmospheric pressure is closed, water under pressure will again flow through the passages 50 and 52 and fill the closure chamber 54, closing the valve 10.

In order to hold the valve 10 closed in the absence of fluid under pressure in the closure chamber 54, an externally threaded shaft 56 is received through an internally threaded bore 58 in an upstanding boss 60 on the bonnet 26. The shaft 56 is provided at its outer end with a handle 62 to facilitate manual turning of the shaft, and a generally flat abutment 64 at its inner end which bears against the rivet 47 for holding the seal 40 firmly against the valve seat 42 when the shaft 56 is screwed downwardly. An O-ring 66 is provided between the shaft 56 and bore 58 for preventing water from leaking out of the closure chamber 54 around the shaft 56.

For manually opening the valve 10, a manually operated bleed plug 68 is threadably received in an opening 70 through the bonnet 26. By turning a knob 72, the plug 68 opens the closure chamber 54 to atmospheric pressure, thereby opening the valve 10, and upon closing the plug 68, the closure chamber 54 refills with water through the passages 50 and 52, and the valve 10 will close as described above.

In accordance with the present invention, an internally balanced pressure regulating module, indicated generally by reference numeral 80 in FIG. 2, is disposed between the remotely controlled solenoid actuated supply valve 10 and the actuating solenoid valve 18 for regulating the pressure downstream of the supply valve by modulating the rate at which fluid is bled from the closure chamber 54 of the valve in response to downstream pressure. The module 80 regulates the downstream pressure independent of either the flow rate through the valve or the line pressure upstream of the valve, and an external fitting 82 on the module permits the device to be easily set to the desired pressure when mounted for normal operation. Further, the module of this invention is relatively inexpensive to manufacture, is trouble free and reliable to use, and is adapted to be used either with new valves of the type generally described above or for converting existing solenoid actuated valves to add the pressure regulation capability.

The module 80 includes a housing 84 having a lower cylindrical portion 86 provided with external threads 88 for cooperating with internal threads 90 on the inside wall of a recess 92 formed in the top of the bonnet 26. In the preferred embodiment of the module 80, the housing 84 can be constructed conveniently and economically of a moldable plastic material, and the external threads 88 are formed on a metal insert 94 about which the housing is molded.

For providing communication between the passage 50 and 52, both of the passages 50 and 52 open into the recess 92. For providing a venting passage to an area of downstream pressure, a central upstanding boss 96 in the recess 92 is provided with an axial passage 98 which communicates through the bonnet 26 and body 24, and opens into the outlet 20 inwardly of the internal threads 36. A tab 100 extending outwardly from the diaphragm 38 and having appropriate apertures therethrough to accommodate the passages 50 and 98, provided to prevent water from leaking out of the passages between the body 24 and bonnet 26.

The lower cylindrical portion 86 of the housing 84 includes an internal bore 102 which forms, together with the recess 92, a lower chamber 104, and a downwardly extending projection 106 in the lower chamber 104 is arranged to sealingly abut the top of the central boss 96 to prevent direct communication between the passages 50 and 52 and the passage 98 within the recess 92. In this way, in order for the valve 10 to be opened automatically, the fluid pressure in the closure chamber 54 must be released by permitting fluid to flow through the module 80, entering through the passage 52 and exiting into the outlet 20 through the passage 98.

Toward this end, the solenoid valve 18 is arranged in the path from the passage 52 to the passage 98 and includes a tubular solenoid body 108 to which an energizing coil 110 is attached and within which an axially reciprocal core 112 is disposed. The core 112 is spring biased to hold a seal 114, carried by the core, in sealing engagement with a solenoid valve seat 116 formed in the housing 84, and the coil 110 can be energized by electrical connections 118 in order to retract the core 112 away from the seat 116 in a manner well known in the art, thereby opening the solenoid valve 18.

In order to retain the solenoid valve 18 on the housing 84, a retaining nut 120 having external threads 122 cooperating with internal threads 124 formed in the housing 84, bears against a flange 126 on the solenoid body 108 and captures the flange between the nut and housing 84. As described in connection with the lower cylindrical portion 86, the internal threads 124 are preferably formed on a metal insert 128 about which the housing 84 is molded.

By energizing the coil 110 and opening the solenoid valve 18, fluid under pressure in the lower chamber 104 is permitted to flow through a vertical passage 130, over the solenoid valve seat 116, and through a generally horizontal passage 132 into a bore 134 extending into the housing 84 from the top thereof. For completing the fluid path from the closure chamber 54 to the outlet 20, a generally vertical passage 136 opens into the bottom of the bore 134 and extends along the axis of the downwardly extending projection 106, connecting with the passage 98, which opens into the outlet 20. By this arrangement, when the solenoid valve 18 is energized and therefore opened, water under pressure in the closure chamber 54 is released through the module 80 to the outlet 20, thereby opening the valve 10, and when the solenoid valve is closed, the closure chamber 54 will refill as described above, and the valve 10 will close.

For regulating the rate of flow of fluid through the module 80 in response to the fluid pressure at the outlet 20, a flow regulator, indicated generally by reference numeral 140 in FIG. 2, is arranged in the fluid path from the passage 132 to the passage 136 by being disposed within the bore 134. As can best be seen in FIG. 3, the regulator 140 includes a cylinder housing 142 having external threads 144 which cooperate with internal threads 146 at the upper end of the bore 134, and an appropriate seal 148, to secure the cylinder housing 142 within the bore 134 in a fluid tight manner.

The cylinder housing 142 has a region of decreased outside diameter 150 which extends across the point at which the passage 132 opens into the bore 134, and ends in an increased diameter portion 152 arranged to carry an O-ring 154 in a conventional manner for sealingly engaging the wall of the bore 134. The housing 142 also includes an axially disposed hollow cylinder 156 extending throughout the housing, having an open end 158 adjacent the bottom of the bore 134 and being closed at its upper end by a bolt 160 having external threads 162 cooperating with internal threads 164 in the upper end of the cylinder 156 permitting axial adjustment of the position of the bolt 160 by manually turning a knob 166.

Mounted for reciprocal movement within the cylinder 156 is a piston 168 having an O-ring 170 for sealingly engaging the wall of the cylinder 156 in a conventional manner, the piston 168 being biased toward the open end 158 by a helical spring 172 disposed between the piston and a spring abutment 174 bearing against the inward end of the bolt 160. The piston 168 is connected by an elongated rod 176 to a generally cylindrical flow restricting member 178 disposed adjacent the open end 158 of the cylinder 156, and having a first surface 180 facing inwardly toward the cylinder 156 and a generally flat second surface 182 facing outwardly of the cylinder and exposed to the fluid pressure at the outlet 20 through the passages 136 and 98. A generally conical flow restricting member (not shown) can be used having a tapered surface facing inwardly of the cylinder 156 and a flat base surface facing outwardly, but the cylindrical member 178 is preferred.

In operation of the flow regulator 140, when the solenoid valve 18 is open permitting fluid to flow from the closure chamber 54 through the module 80, fluid entering the bore 134 from the passage 132 is trapped between the seal 148 and O-ring 154 on the cylinder housing 142 and forced to enter the cylinder 156 through an aperture 184 in the cylinder wall between the piston 168 and flow restricting member 178. The fluid entering the cylinder 156 exerts a substantially equal but opposite force on the piston 168 and flow restricting member 178 since each is exposed to the high pressure fluid over an area substantially equal to the cross-sectional area of the cylinder 156. By this arrangement, the flow regulator 140 is said to be internally balanced, since the combination of the piston 168 and flow restricting member 178 will not be urged to move in either axial direction under the influence of upstream pressure. Fluid under pressure in the cylinder 156 will then flow through that portion of the open end 158 of the cylinder not occupied by the flow restricting member 178, and thereafter through the passages 136 and 98 to the outlet 20 of the valve 10.

As described above, with the fluid path through the module 80 open from the closure chamber 54 to the outlet 20, the valve 10 will open causing the fluid pressure at the outlet 20 to increase. The increased pressure at the outlet 20 will act through the passages 98 and 136 upon the second surface 182 of the flow restricting member 178 forcing the flow restricting member 178, against the force of the spring 172, into a flow restricting relationship with the open end 158 of the cylinder 156. To permit free movement of the piston 168 in the cylinder 156 in response to pressure at the outlet 20, the space between the piston and abutment 174 is vented to atmospheric pressure through an aperture 183 in the housing 142.

By this arrangement, if the fluid pressure at the outlet 20 rises above a predetermined pressure, the flow restricting member 178 will be forced into a position restricting the flow of fluid through the module 80 to such an extent that fluid under pressure in the lower chamber 104 will flow through the passage 52 and into the closure chamber 54 thereby causing the diaphragm 38 to move the seal 40 closer to the valve seat 42, and causing a reduction of pressure at the outlet 20. Conversely, if the pressure at the outlet 20 falls below a predetermined pressure, the force of the spring 172 will overcome the force acting upon the second surface 182 and move the flow restricting member 178 away from the open end 158 of the cylinder 156 thereby permitting an increased flow through the module 80, causing additional fluid to be bled from the closure chamber 54 and lifting the diaphragm 38 and seal 40 further from the valve seat 42 causing an increase of pressure at the outlet 20.

The regulator 140 is arranged to be adjusted for modulating the flow through the module 80 in order to achieve any desired pressure at the outlet 20. Toward this end, the fitting 82, which may be of any conventional design such as a SCHRADER valve, is secured in an aperture 186 through the wall of the housing 84 and opening into the bore 134 adjacent the flow restricting member 178 and below the cylinder housing 142. By attaching a conventional pressure gauge (not shown) to the fitting 82 and opening the valve 10, a workman can adjust the axial position of the bolt 160 until the desired pressure appears on the gauge. Having selected the desired axial position of the bolt 160, a locknut 188 on the bolt 160 can be screwed tightly against the top of the cylinder housing 142 for retaining the bolt 160 in the desired axial position.

Although the remotely controlled valve 10 has been illustrated as being actuated by a solenoid valve 18, it will be appreciated that the solenoid valve 18 could be replaced by a conventional hydraulic or mechanical valve (not shown). For manual actuation of the valve 10, a simple plug (not shown) can be threadably received by the internal threads 124. As long as the plug does not close the solenoid valve seat 116, the flow regulator 140 will regulate the pressure at the outlet 20 of the valve 10 whenever the shaft 56 is moved to the position shown in FIG. 2. To close the valve 10, the shaft 56 can be screwed downwardly, as described above.

From the foregoing, it will be appreciated that the module 80 of the present invention provides a device by which the pressure downstream of the valve is controlled by modulating the rate at which fluid is bled from the closure chamber 54 of the valve in response to the downstream pressure. Morever, the regulator module 80 is adapted for use with conventional remotely actuated valves, and can easily be used in connection with an existing valve for adding the highly desirable pressure regulation capability to the existing valve. Toward this end, the external threads 88 on the lower cylindrical portion 86 of the module 80 are preferably of the same diameter and pitch as the external threads 122 on the retaining nut 120. By this arrangement, the module 80 can be secured to a valve 10 in the position originally intended to receive the solenoid valve 18, and the solenoid valve 18 can be easily secured to the module 80 as described above. Further, the module 80 includes an internally balanced regulator 140 for regulating the downstream pressure of the valve 10 independent of the pressure supplied to the valve.

While a particular form of the invention has been illustrated and described, it will be apparent that various modifications can be made without departing from the spirit and scope of the invention.

We claim:

1. In combination with a fluid supply valve, a regulator module for converting said fluid supply valve to a fluid supply and pressure regulating valve, said module comprising:

a housing having a passage formed therein, said passage having an inlet and an outlet, said housing including first fitting means for cooperating with an actuator receiving fitting on said valve for mounting said housing on said valve;

an actuator for selectively opening or closing said passage through said housing, said actuator including second fitting means for cooperating with an actuator receiving fitting on said housing for mounting said actuator on said housing, said first and second fitting means being substantially identical to each other; and a flow regulator in said passage including a piston disposed for axial reciprocation in a cylinder, a generally cylindrical flow restricting means spaced from said position and secured thereto for axial reciprocation therewith, said flow restricting means disposed adjacent a first open end of said cylinder and having a first surface facing said open end of said cylinder and a second surface facing outwardly of said cylinder and exposed to fluid pressure at the outlet of said passage, and a resilient biasing means between said piston and a second end of said cylinder, said flow restricting means being movable toward said open end into a flow restricting relationship therewith in response to fluid pressure at said outlet and against the force of said biasing means.

2. A module as set forth in claim 1 including an aperture through said cylinder wall between said piston and said flow restricting means for receiving fluid into said cylinder from said inlet whereby a substantially equal and opposite force is imposed on said piston and flow restricting means by the fluid pressure at said inlet.

3. A module as set forth in claim 1 wherein said fluid supply valve is a normally closed valve which is held closed by fluid under pressure in a closure chamber bearing against a pressure responsive means, and which is opened by actuating said actuator thereby permitting fluid in said chamber to flow through said passage, and wherein said inlet communicates with said closure chamber and said outlet communicates with a region of lower fluid pressure.

4. A module as set forth in claim 3 wherein said region of lower fluid pressure is within a downstream end of said fluid supply valve.

5. A module as set forth in claim 1 wherein said actuator is a solenoid valve.

6. In combination with a fluid supply valve including an actuator, a regulator module for connection to said supply valve comprising:
- a housing having a passage therethrough, said passage having an inlet and an outlet;
- means in said passage for controlling a flow of fluid through said passage in response to fluid pressure at said outlet;
- first means on said housing adjacent both said inlet and said outlet for securing said housing to an actuator receiving means on said fluid supply valve; and
- second means on said housing for securing said actuator to said housing in a position for selectively opening and closing communication through said passage, said second means defining an internally threaded recess for cooperating with an externally threaded securing means on said actuator, and said first means defining a portion of said housing having external threads of the same size as said externally threaded securing means on said actuator.

7. A module as set forth in claim 6 wherein said fluid supply valve is a normally closed valve which is held closed by fluid under pressure in a closure chamber bearing against a pressure responsive means, and which is opened by permitting fluid in said chamber to flow to a region of lower fluid pressure, and wherein said inlet communicates with said closure chamber and said outlet communicates with said region of lower fluid pressure.

8. A module as set forth in claim 7 wherein said region of lower fluid pressure is within a downstream end of said fluid supply valve.

9. A module as set forth in claim 6 wherein said means for controlling said flow of fluid through said passage restricts said flow in response to increased pressure at said outlet and permits increased flow in response to decreased pressure at said outlet.

10. A module as set forth in claim 6 wherein said actuator is a solenoid valve.

11. A module as set forth in claim 6 wherein said means for controlling said flow of fluid through said passage includes:
- a piston disposed for axial reciprocation in a cylinder;
- a generally cylindrical flow restricting means spaced from said piston and secured thereto for axial reciprocation therewith, said flow restricting means disposed adjacent a first open end of said cylinder and having a first surface facing said open end of said cylinder and a second surface facing outwardly of said cylinder and exposed to fluid pressure at said outlet;
- an aperture through a wall of said cylinder between said piston and said flow restricting means for receiving fluid into said cylinder from said inlet; and
- a resilient biasing means between said piston and a second end of said cylinder, said flow restricting means being movable toward said open end into a flow restricting relationship therewith, against the force of said biasing means, in response to fluid pressure at said outlet.

12. For use with a fluid supply valve having an inlet and an outlet, a valve seat between said inlet and said outlet, a sealing means carried by a pressure responsive means, and a chamber partially defined by said pressure responsive means whereby an increase of pressure in said chamber urges said sealing means toward said seat and a decrease of pressure in said chamber urges said sealing means away from said seat, a regulator module comprising:
- a housing having a passage formed therein, said housing including first fitting means for cooperating with an actuator receiving fitting on said valve for mounting said housing on said valve with said passage communicating between said chamber and said outlet;
- an actuator for selectively opening and closing said passage, said actuator including second fitting means for cooperating with an actuator receiving fitting on said housing for mounting said actuator on said housing, said first and second fitting means being substantially identical to each other;
- a piston disposed for axial reciprocation in a cylinder;
- a flow restricting means spaced from said piston and secured thereto for axial reciprocation therewith, said flow restricting means disposed adjacent a first open end of said cylinder and having a first surface facing said open end of said cylinder and a second surface facing outwardly of said cylinder and exposed to fluid pressure at said outlet;
- an aperture formed through a wall of said cylinder between said piston and said flow restricting means for receiving fluid into said cylinder from said chamber; and
- a resilient biasing means between said piston and a second end of said cylinder, said flow restricting means being movable toward said open end into a flow restricting relationship therewith, against the force of said biasing means, in response to fluid pressure at said outlet.

13. A module as set forth in claim 1, 11 or 12 wherein said resilient biasing means is a helical spring bearing against said piston at one end and an axially movable abutment adjacent said second end of said cylinder, the position of said abutment being axially adjustable for varying the amount of force required to move said flow restricting means into said flow restricting relationship with said open end.

14. A module as set forth in claim 13 including a fitting on said module communicating with said passage adjacent said flow restricting means to which a pressure gauge can be attached for measuring the pressure at said outlet during adjustment of said abutment.

15. A module as set forth in claim 3, 7 or 12 wherein said pressure responsive means is a diaphragm.

16. For use with a normally closed solenoid actuated diaphragm valve having an inlet and an outlet, a valve seat between said inlet and outlet, a sealing means carried by said diaphragm valve, and a chamber partially defined by one side of said diaphragm valve for receiving fluid under pressure from said inlet thereby causing said diaphragm valve to urge said sealing means into sealing engagement with said valve seat, a pressure regulating module comprising:

- a housing having a passage formed therein, said housing including first fitting means for cooperating with an actuator receiving fitting on said diaphragm valve for mounting said housing on said valve with said passage communicating between said chamber and said outlet;
- a solenoid actuator for selectively opening and closing said passage thereby venting said chamber to said outlet for opening said diaphragm valve, said actuator including second fitting means for cooperating with an actuator receiving fitting on said housing for mounting said actuator on said housing, said first and second fitting means being substantially identical to each other;
- a cylinder having a closed end and an open end;
- a piston sealingly engaging the inner wall of said cylinder and arranged for axially reciprocal movement within said cylinder;
- a resilient biasing means between said piston and said closed end for urging said piston toward said open end;
- a generally cylindrical flow restricting means spaced from said piston, having a first surface adjacent said outlet and facing inwardly of said cylinder and a second surface facing outwardly of said cylinder, and connected to said piston for reciprocal movement therewith; and
- an aperture formed through said cylinder between said piston and said flow restricting means and through which fluid under pressure from said chamber is admitted into said cylinder, said open end of said cylinder being adjacent the outlet end of said passage whereby fluid pressure at said outlet acts upon said second surface and urges said flow restricting means toward said open end, against the force of said biasing means, thereby restricting flow from said chamber to said outlet.

17. A device as set forth in claim 16 wherein said resilient biasing means is a helical spring bearing against said piston at one end and an axially movable abutment adjacent said closed end of said cylinder, the position of said abutment being axially adjustable for varying the amount of force required to move said flow restricting means into a flow restricting relationship with said open end.

* * * * *